United States Patent
Matsunaga et al.

(10) Patent No.: US 7,739,881 B2
(45) Date of Patent: Jun. 22, 2010

(54) REFRIGERATION CYCLE

(75) Inventors: Ken Matsunaga, Kariya (JP); Yoshitaka Tomatsu, Chiryu (JP)

(73) Assignee: Denso Corporation, Kariya (JP)

( * ) Notice: Subject to any disclaimer, the term of this patent is extended or adjusted under 35 U.S.C. 154(b) by 617 days.

(21) Appl. No.: 11/639,396

(22) Filed: Dec. 14, 2006

(65) Prior Publication Data
US 2007/0151270 A1    Jul. 5, 2007

(30) Foreign Application Priority Data
Dec. 15, 2005    (JP) .............................. 2005-361978

(51) Int. Cl.
F25B 5/00        (2006.01)
F25B 1/00        (2006.01)
F25B 41/04       (2006.01)

(52) U.S. Cl. ..................... 62/200; 62/228.1; 62/216

(58) Field of Classification Search .......... 62/200, 62/216, 228.1, 197, 199
See application file for complete search history.

(56) References Cited

U.S. PATENT DOCUMENTS

| 6,053,417 A * | 4/2000 | Hotta et al. ............... 236/92 B |
| 2001/0027659 A1 * | 10/2001 | Ota et al. .................. 62/228.3 |
| 2005/0178523 A1 * | 8/2005 | Itoh et al. ................... 165/42 |
| 2006/0137388 A1 | 6/2006 | Kakehashi et al. |

FOREIGN PATENT DOCUMENTS

| JP | 406241610 A * | 9/1994 | ................ 62/296 |
| JP | 10-267438 | 10/1998 | |
| JP | 2003-279180 | 10/2003 | |
| JP | 2006-177632 | 7/2006 | |

* cited by examiner

*Primary Examiner*—Chen-Wen Jiang
(74) *Attorney, Agent, or Firm*—Harness, Dickey & Pierce, PLC (57) ABSTRACT

A refrigeration cycle controls a second evaporator while a first evaporator is operating. The refrigeration cycle of the present invention makes a differential pressure between an inlet refrigerant pressure and an outlet refrigerant pressure of a second evaporator solenoid valve when starting or stopping the second evaporator during operation of the first evaporator smaller than the differential pressure when operating only the first evaporator, then opening or closing the second evaporator solenoid valve.

5 Claims, 6 Drawing Sheets

PRIOR ART

REFRIGERATION CYCLE

TECHNICAL FIELD

The present invention relates to a refrigeration cycle provided with a plurality of evaporators which is suitable for use for a supercritical refrigeration cycle using a $CO_2$ (carbon dioxide) refrigerant or other such refrigerant where the high pressure becomes the critical pressure or more (supercritical state).

BACKGROUND ART

Figure 1A:
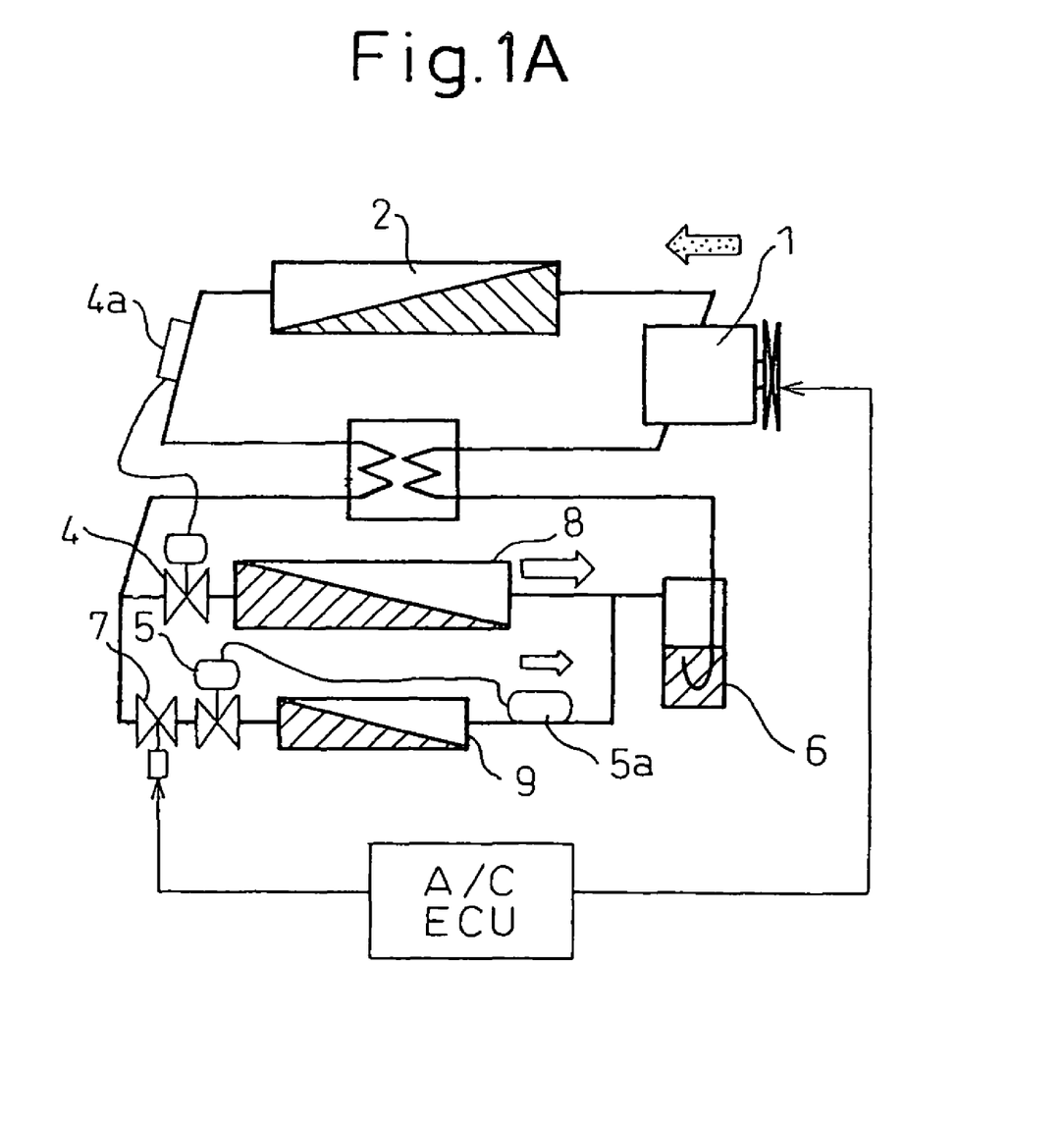
FIG. 1A is a circuit diagram of a refrigeration cycle of the prior art.

The inventors previously proposed a refrigeration cycle, as shown in FIG. 1A, configured by a plurality of evaporators 8, 9 connected in parallel. In the configuration of FIG. 1A, a first pressure reducer 4 reducing the pressure of the refrigerant flowing into a first evaporator 8 among a plurality of evaporators 8, 9 is configured by a temperature type valve mechanism.

Further, by controlling the opening degree of the first pressure reducer 4 based on the refrigerant temperature of the radiator outlet sensed by a temperature sensing part 4a, the outlet refrigerant pressure of the radiator 2 is controlled to become a target pressure determined by the radiator outlet refrigerant temperature so as to improve the cycle operating efficiency. An accumulator 6 is arranged at the outlet side of the first evaporator 8 to prevent liquid refrigerant from being sucked into the compressor 1 from the channel at the first evaporator 8 side.

Further, a second pressure reducer 5 provided in parallel with the first pressure reducer 4 is configured by a temperature type expansion valve. This temperature type expansion valve is designed to reduce the pressure of the refrigerant flowing into the second evaporator 9. This temperature type expansion valve has a temperature sensing part 5a changing in internal pressure in accordance with the outlet refrigerant temperature of the second evaporator 9 and controls overheating of the outlet refrigerant of the second evaporator 9. Due to this, the liquid refrigerant is prevented from being sucked into the compressor 1 from the channel at the second evaporator 9 side.

Further, a solenoid valve 7 forming a shutoff valve for cutting off the flow of refrigerant of a second refrigerant channel B is provided in the second refrigerant channel B. Note that the first evaporator is for generating driver's seat side (front seat side) cooling air, while the second evaporator is for generating rear seat side cooling air.

Specifically, a solenoid valve 7 is provided in the second refrigerant channel B at the inlet side of the second pressure reducer 5. When cooling action of the second evaporator 9 is unnecessary, that is, when the operation of the rear seat side air-conditioning unit is stopped, the solenoid valve 7 is closed to cut off the flow of refrigerant of the second refrigerant channel B. Note that the solenoid valve 7 may also be provided at the outlet side of the second pressure reducer 5.

Further, in FIG 1A, the second pressure reducer 5 and the solenoid valve 7 are illustrated as being separate parts, but as disclosed in Japanese Patent Publication (A) No. 11-182983, they may also be integrally formed. On the other hand, when making the second pressure reducer 5 a fixed aperture type, it is possible to integrally form an orifice forming an aperture passage in the refrigerant channel in the housing (not shown) of the solenoid valve 7. Due to this, the second pressure reducer 5 can be formed integrally with the solenoid valve 7.

The configuration of FIG. 1A is proposed in Japanese Patent Application No. 2004-372956.

In such a refrigeration cycle, when turning on the switch for switching to the rear seat cooling operation so as to start the rear seat cooling operation during the cooling operation at the driver's seat side, a "whoosh" like unpleasant noise is caused. That is, this is the sound caused by the solenoid valve 7 opening when starting the second evaporator during operation of the first evaporator. When turning the switch on, if the solenoid valve 7 is opened, the large differential pressure between the refrigerant inlet pressure and refrigerant outlet pressure of the solenoid valve causes refrigerant to rapidly jet out from the valve opening part. The unpleasant noise is the rushing noise caused by this shock. This unpleasant noise gives the passengers an unpleasant or uneasy feeling.

Conversely, unpleasant noise is caused even when turning off the rear seat cooling operation switch during the cooling operation at both the driver's seat side and rear seat side. This is due to the reverse principle from the above. If the solenoid valve 7 is rapidly closed, the high pressure inlet refrigerant of the solenoid valve will rapidly be cut off. The unpleasant noise is the water hammer noise caused by this shock.

DISCLOSURE OF INVENTION

The present invention was made in consideration of the above problem and has as its object the provision of a refrigeration cycle not causing any unpleasant noise mainly when starting or stopping a second evaporator during operation of a first evaporator.

A first aspect of the present invention is characterized by making a differential pressure between an inlet refrigerant pressure and outlet refrigerant pressure of a second evaporator solenoid valve (or second evaporator downstream solenoid valve) when starting or stopping a second evaporator during operation of a first evaporator smaller than the differential pressure when operating only the first evaporator, then opening or closing the second evaporator solenoid valve (or second evaporator downstream solenoid valve). By reducing the differential pressure causing the unpleasant noise, the unpleasant noise can be reduced.

A second aspect of the present invention is characterized in that the second evaporator solenoid valve (or second evaporator downstream solenoid valve) is a pilot type solenoid valve. The opening operation and closing operation of a pilot type solenoid valve is performed in two stages, so rushing noise becomes further harder to be caused. Further, a pilot type solenoid valve operates a pilot valve by the pressure difference before and after it in a second stage opening/closing operation, so a spring force relating to the pilot valve or an electromagnetic force countering it may be set smaller than the corresponding forces of a usual direct acting solenoid valve. For this reason, a pilot type solenoid valve can be made smaller than a usual direct acting type solenoid valve.

A third aspect of the present invention is characterized in that the second pressure reducer and the second evaporator solenoid valve are integrally formed.

A fourth aspect of the present invention is characterized by being provided with a pressure control means 4a for controlling an opening degree of the first pressure reducer 4 so as to regulate a refrigerant pressure of the radiator 2 outlet and an overheating control means 5a for controlling an opening degree of the second pressure reducer 5 so as to regulate overheating of the refrigerant of the second evaporator outlet.

A fifth aspect of the present invention is characterized by reducing a working capacity of the compressor so as to reduce the differential pressure. Due to this, addition of special devices becomes unnecessary.

A sixth aspect of the present invention is characterized in that the second pressure reducer has a variable aperture for opening or cutting off the inflow of refrigerant to the second evaporator and gradually opens or shuts the variable aperture when starting or stopping the second evaporator during operation of the first evaporator. By gradually opening or shutting the variable aperture, it becomes possible to ease the inflow or cutoff of refrigerant to the second evaporator and thereby reduce the rushing noise or water hammer noise.

A seventh aspect of the present invention is characterized in that the refrigerant is $CO_2$ raised to a critical pressure or more. When using $CO_2$ raised to a critical pressure or more for the refrigerant, the differential pressure becomes remarkably larger than during use of a usual refrigerant R134a and the rushing noise or water hammer noise becomes larger. For this reason, when the refrigerant is the supercritical state $CO_2$, the effect of employing the present invention (reduction of unpleasant noise) becomes remarkable.

Below, the present invention will be able to be understood more sufficiently from the attached drawings and the description of the preferred embodiments of the present invention.

Below, embodiments of the present invention will be explained with reference to the drawings.

FIRST EMBODIMENT

Figure 1B:
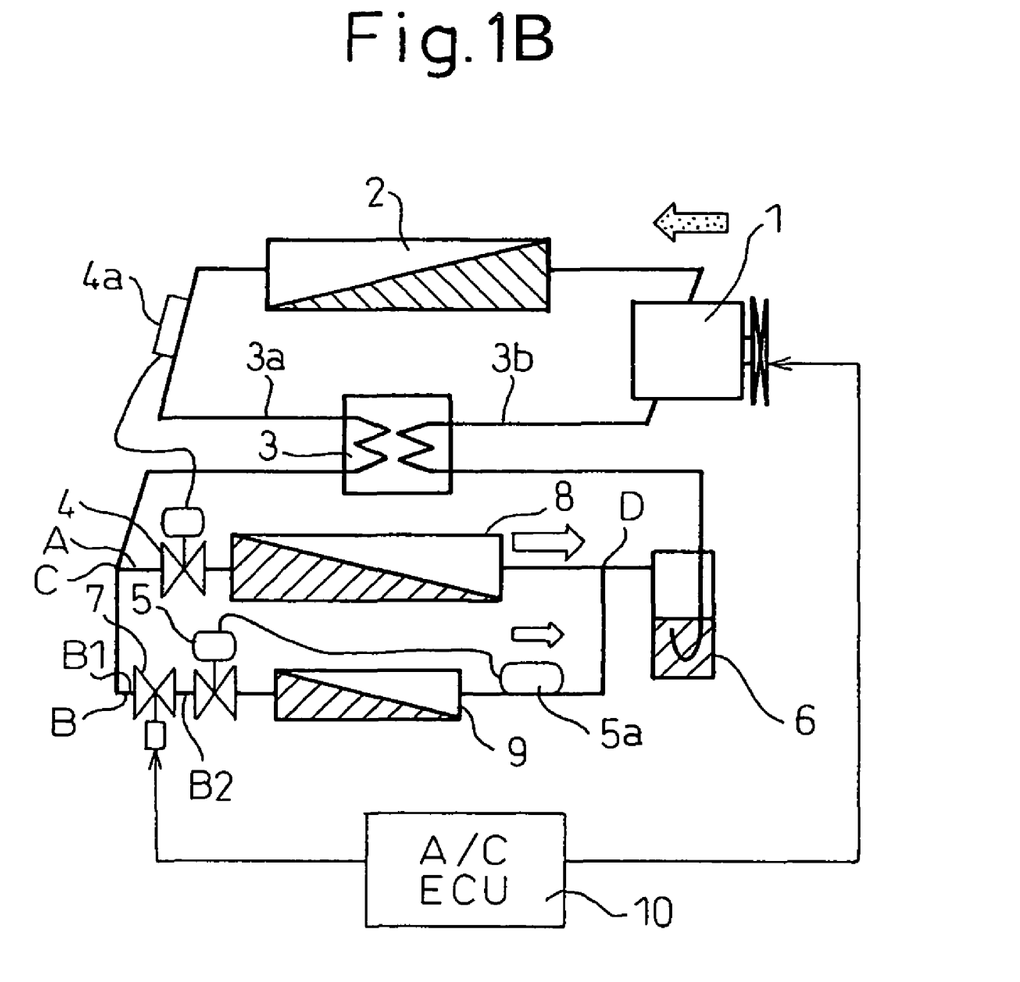
FIG. 1B is a circuit diagram of a refrigeration cycle of a first embodiment according to the present invention.

FIG. 1B is a view of the configuration of a refrigeration cycle for vehicle air-conditioning showing a first embodiment of the present invention. This refrigeration cycle uses a refrigerant comprised of $CO_2$ having a high pressure of the critical pressure or more (supercritical state). Therefore, this refrigeration cycle forms a supercritical refrigeration cycle.

A compressor 1 obtains drive power from a not shown vehicle engine through an electromagnetic clutch (not shown) to suck in and compress the refrigerant. Note that the compressor 1 may be any of a fixed capacity type compressor operating continuously by operation of an electromagnetic clutch or a variable capacity type compressor able to be changed in discharge capacity.

A discharge side of the compressor 1 is provided with a radiator 2 forming an outside unit. This radiator 2 exchanges heat between a discharged refrigerant in the high temperature, high pressure supercritical state discharged from the compressor 1 and the outside air so as to cool the refrigerant. The radiator 2 is sent outside air by a not shown electrically powered cooling fan.

At the outlet side of the radiator 2, the high pressure side refrigerant channel 3a of the internal heat exchanger 3 is provided. Here, the internal heat exchanger 3 performs heat exchange between the high temperature high pressure refrigerant of the high pressure side refrigerant channel 3a and the low temperature, low pressure refrigerant of the low pressure side refrigerant channel 3b.

This heat exchange reduces the enthalpy of the refrigerant flowing into the later explained evaporators 8, 9 to increase the enthalpy difference (refrigeration capacity) of the refrigerant between the refrigerant inlet and outlet of the evaporators 8, 9. If setting the internal heat exchanger 3 in this way, it is possible to increase the enthalpy difference of the refrigerant between the refrigerant inlet and outlet of the evaporators 8, 9 (refrigeration capacity) and improve the cycle operating efficiency (COP).

At the outlet side of the high pressure side refrigerant channel 3a of the internal heat exchanger 3 is provided a first refrigerant channel A and a second refrigerant channel B in parallel. C indicates a branching point of the two channels A, B, while D indicates a merging point of this two channels A, B. Note that in the present embodiment, the first refrigerant channel A forms a front seat side air-conditioning use refrigerant channel, while the second refrigerant channel B forms a rear seat side air-conditioning use refrigerant channel.

Further, the first refrigerant channel A is provided with a first pressure reducer 4 performing the role of a pressure control valve for controlling the high pressure. This first pressure reducer 4 is adjusted in opening degree by a control means comprised of a mechanical mechanism so that the cycle high pressure becomes a target high pressure.

This pressure reducer 4 has a temperature sensing part 4a as part of the control means provided between the outlet side of the radiator 2 and the inlet side of the high pressure side refrigerant channel 3a of the internal heat exchanger 3 and generates a pressure corresponding to the temperature of the high pressure refrigerant of the outlet side of the radiator 2 inside this temperature sensing part 4a.

Further, by adjusting the aperture opening degree of the first pressure reducer 4 (valve element opening degree) by the balance between the inside pressure of the temperature sensing part 4a and the high pressure (specifically, the outlet side refrigerant pressure of the high pressure side refrigerant channel 3a of the internal heat exchanger 3), the high pressure is adjusted to the target high pressure determined by the high pressure refrigerant temperature of the outlet side of the radiator 2. As the pressure reducer 4 having this high pressure control function, one disclosed in Japanese Patent Publication (A) No. 2000-81157 etc. may be used.

The first evaporator 8 is provided at the outlet side of the first pressure reducer 4 in the first refrigerant channel A. This first evaporator 8 is arranged inside a case forming the air passage of the front seat side cabin air-conditioning unit of the vehicle air-conditioning system and forms a cooling means for cooling the air in the case. The front seat side cabin air-conditioning unit is usually arranged in the space inside of the instrument panel at the front of the vehicle cabin. An electrically powered blower is arranged at the upstream side of the flow of air of the first evaporator 8. Inside air or outside air introduced through a not shown inside/outside air switchbox is blown into the case.

Note that a heater core (not shown) etc. forming a heating means for heating the air is arranged at the downstream side of the flow of air of the first evaporator 8 in the case. Air-conditioning air adjusted in temperature by the heating degree of this heater core is blown out from a vent (not shown) at the case at the downstream side of the flow of air to the front seat side region of the vehicle cabin.

An accumulator 6 is provided at the outlet side of the first evaporator 8. This accumulator 9 is a gas-liquid separating means separating the liquid refrigerant and gas refrigerant of the outlet refrigerant of the first evaporator 8 and storing the excess refrigerant in the cycle. The outlet side of the accumulator 6 is connected to an inlet side of the low pressure side refrigerant channel 3b of the internal heat exchanger 3. Further, the outlet side of the low pressure side refrigerant channel 3b of the internal heat exchanger 3 is connected to the suction side of the compressor 1.

On the other hand, the second refrigerant channel B is provided with a second pressure reducer 5 and a second evaporator 9 in series. This second pressure reducer 5 is adjusted in opening degree by a temperature type expansion valve having a temperature sensing part 5a. The opening degree of this second pressure reducer 5 is adjusted by a mechanical mechanism including a temperature sensing part 5a as a control means so that the refrigerant overheating at the outlet of the second evaporator 9 becomes a target value. The second pressure reducer 5 may also be configured by a fixed aperture with a fixed aperture opening degree. This fixed aperture is specifically configured by an orifice etc.

An outlet side channel of the second evaporator 9 merges with the outlet side refrigerant channel of the first evaporator 8 and leads to the accumulator. Further, the refrigerant flows from the outlet of the accumulator 6 to the low pressure side refrigerant channel 3b of the internal heat exchanger 3.

The second evaporator 9 is arranged inside the case forming the air passage of the rear seat side cabin air-conditioning unit of the vehicle air-conditioning system and forms a cooling means for cooling the air in the case. The rear seat side cabin air-conditioning unit is arranged in the region of the vehicle cabin rear seat side (for example, the chassis side panel etc. at the rear seat side). An electrically powered blower is arranged at the upstream side of the flow of air of the second evaporator 9. The inside air (vehicle cabin air) is blown into the case.

The cooling air cooled by the second evaporator 9 is blown out from a vent (not shown) at the end of the case at the downstream side of the flow of air to the rear seat side region of the vehicle cabin. Note that rear seat side cabin air-conditioning unit may also be provided with a heater core etc. in the same way as the front seat side cabin air-conditioning unit. Further, reference numeral 10 is an electronic control unit (ECU) for controlling the compressor 1 and solenoid valve 7. The control unit 10 functions as a control means for reducing the differential pressure between the inlet refrigerant pressure and outlet refrigerant pressure of the solenoid valve 7 when starting or stopping the second evaporator 9 during operation of the first evaporator 8 compared with the differential pressure at the time of operation of just the first evaporator 8, then opening or closing the solenoid valve 7. The control unit 10 includes a switching device for instructing starting or stopping of the second evaporator 9.

Next, the basic operation in the above configuration will be explained. When the compressor 1 is driven to rotate by the drive force of the vehicle engine, the high temperature, high pressure refrigerant ($CO_2$) compressed by the compressor 1 flows into the radiator 2 in the supercritical state with a pressure higher than the critical pressure. Here, the high temperature, high pressure supercritical state refrigerant exchanges heat with the outside air, radiates heat to the outside air, and reduces the enthalpy.

Further, the high pressure refrigerant of the radiator 2 outlet flows into the high pressure side channel 3a of the internal heat exchanger 3 and exchanges heat with the low temperature, low pressure refrigerant (outlet side refrigerant of accumulator 6) passing through the low pressure side channel 3b to be cooled, so further reduces the enthalpy.

The high pressure refrigerant passing through the high pressure side channel 3a of the internal heat exchanger 3 then flows in parallel through the parallel connected first refrigerant channel A and second refrigerant channel B and is reduced in pressure by the first pressure reducer 4 and second pressure reducer 5. In the first evaporator 8, the low pressure refrigerant passed through the first pressure reducer 4 sucks in heat from the blown air of the electric power blower and evaporates. Due to this, the blown air of the electrically powered blower 8 is cooled, then the cooling air is blown out to the vehicle cabin front seat side to cool the vehicle cabin front seat side region.

When the second evaporator 9 is operating, in the second evaporator 9, the low pressure refrigerant passed through the second pressure reducer 10 sucks in heat from the blown air of the electric power blower 14 and evaporates. Due to this, the blown air of the electrically powered blower 14 is cooled. The cooling air is blown out to the vehicle cabin rear seat side to cool the vehicle cabin rear seat side region.

Here, the first pressure reducer 4 adjusts the aperture opening degree so that the actual high pressure becomes the target high pressure determined by the radiator outlet side refrigerant temperature sensed by the temperature sensing part 4a. That is, if the actual high pressure falls below the target high pressure, the first pressure reducer 4 reduces its aperture opening degree, while conversely if the actual high pressure rises further than the target high pressure, the first pressure reducer 4 increases its aperture opening degree. By adjusting the aperture opening degree of the first pressure reducer 4, the actual high pressure is maintained at the target high pressure and the cycle COP is improved.

Further, the second pressure reducer 5 adjusts the aperture opening degree so as to obtain the refrigerant overheating degree determined by the second evaporator outlet side refrigerant temperature sensed by the temperature sensing part 5a. Incidentally, the second pressure reducer 5 may also be configured by a fixed aperture. In this case, even if the cycle operating conditions fluctuate, the opening degree of the second pressure reducer 5 does not change. Therefore, the high pressure can be stably controlled by just the first pressure reducer 4.

Figure 3:
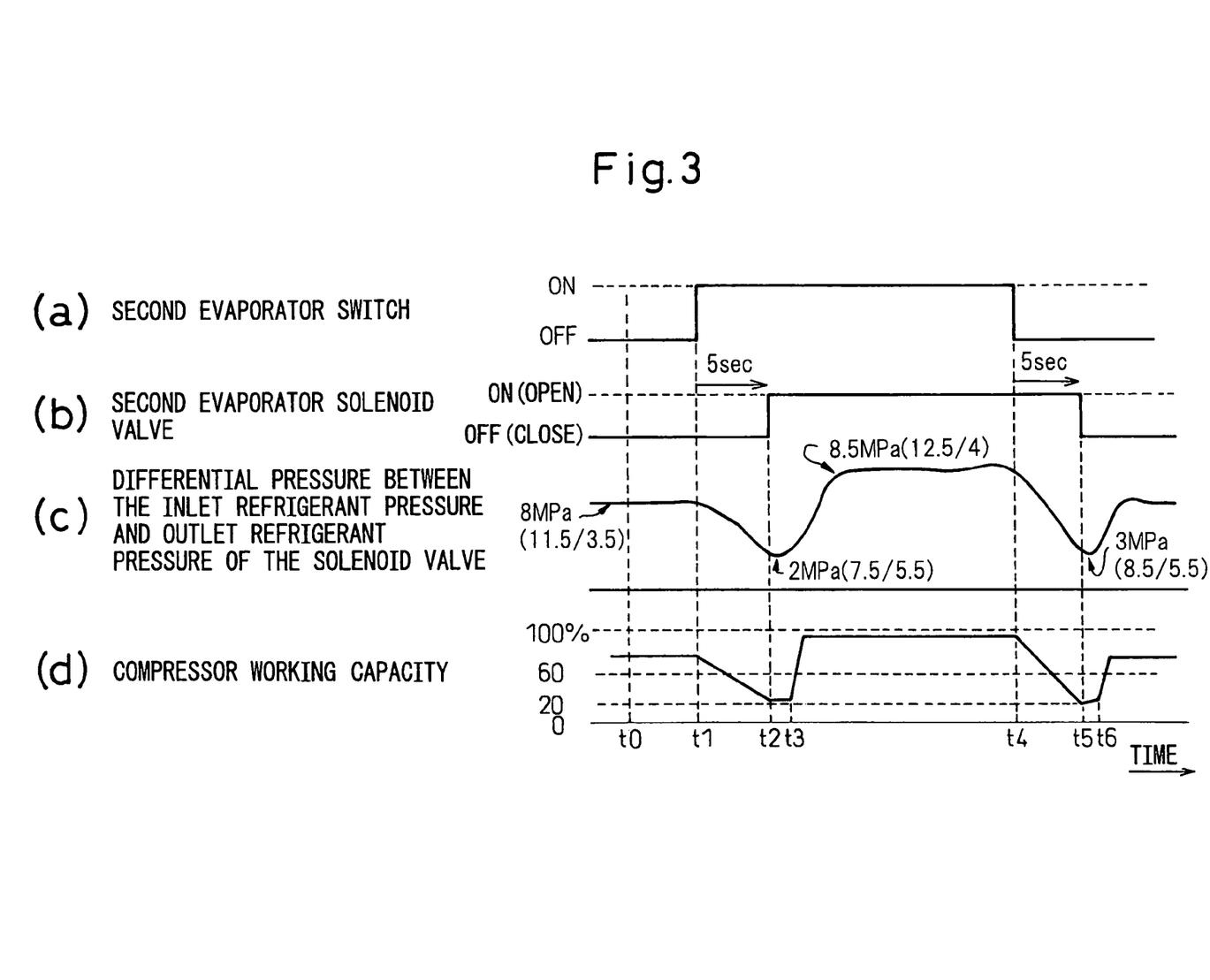
FIG. 3 is a time chart of a first embodiment according to the present invention.

Next, the operation of the first embodiment will be explained based on FIG. 3. FIG. 3 is a view showing the changes with respect to time of the switch serving as the switching device when starting or stopping the second evaporator 9 while the first evaporator 8 is operating, the second evaporator solenoid valve 7, the differential pressure between the inlet refrigerant pressure and outlet refrigerant pressure of the solenoid valve 7 (hereinafter referred to as the "differential pressure"), and the compressor working capacity (time chart).

As shown in FIG. 3, at the time t0, the first evaporator 8 is operating, but the switch is off, so the second evaporator 9 stops. At this time, the refrigerant pressure of the inlet B1 of the solenoid valve 7 is 11.5 MPa, the refrigerant pressure of the outlet B2 is 3.5 MPa, and the differential pressure is 8 MPa. At the time t1, for example, a passenger is sitting at the rear seat. When the switch is turned on, the control unit 10 gradually and slowly reduces the capacity of the compressor 1. The control unit 10 functions as a control means for gradually reducing the differential pressure. For example, the compressor 1 reduces the rotational speed etc. to reduce the working capacity (refrigerant compression amount). Due to this, at a time t2 after a predetermined time (for example 5 seconds) from the time t1, the inlet refrigerant pressure of the solenoid valve 7 becomes 7.5 MPa, the outlet refrigerant pressure becomes 5.5 MPa, and the differential pressure becomes 2

MPa. That is, at this time, the differential pressure becomes smaller than the differential pressure at the time of operation of only the first evaporator 8.

The control unit 10 opens the solenoid valve 7 when the differential pressure is reduced to an extent enabling generation of an unpleasant sound to be suppressed. The control unit 10 functions as a detecting means for detecting when the differential pressure falls to a predetermined value and a control means for opening the solenoid valve 7 is response to this. At the time t2, when the solenoid valve 7 is turned on and the valve is opened, the refrigerant of the second refrigerant channel B flows into the second pressure reducer 5. At this time, the differential pressure becomes relatively small, so the rushing noise generated when the refrigerant flows into the second pressure reducer 5 becomes relatively small.

Note that above, the solenoid valve 7 is turned on at the time 52 a predetermined time after the time t1, but it is also possible to turn on the solenoid valve 7 when the compressor working capacity (refrigerant compression amount) becomes a predetermined value (for example 20% of rated value) or less.

The control unit 10 provides a delay means for continuing control for reducing the differential pressure for a predetermined time after opening the solenoid valve 7. In this embodiment, the control unit 10 opens the solenoid valve 7, then holds the pressure of the compressor at a low capacity for exactly a predetermined short time. After this, the control unit 10 allows the capacity of the compressor 1 to be raised to the capacity in accordance with the cooling load. At the time t3 a bit after the time t2, the compressor 1 increases the working capacity (refrigerant compression amount) by increasing the rotational speed. This is so as to simultaneously operate the first evaporator 8 and second evaporator 9. Due to this, the inlet refrigerant pressure of the solenoid valve becomes 12.5 MPa, the outlet refrigerant pressure becomes 4 MPa, and the differential pressure becomes 8.5 MPa.

At the time t4 (time when there is no longer need to air-condition rear seats), when the switch is turned off, the control unit 10 gradually and slowly reduces the capacity of the compressor 1. The control unit 10 functions as a control means for gradually reducing the differential pressure. For example, the compressor 1 reduces the working capacity (refrigerant compression amount) by reducing the rotational speed etc. Due to this, at a time t5 a predetermined time (for example, 5 seconds) after the time t4, the inlet refrigerant pressure of the solenoid valve 7 becomes 8.5 MPa, the outlet refrigerant pressure becomes 5.5 MPa, and the differential pressure becomes 3 MPa. That is, at this time, the differential pressure becomes smaller than the differential pressure at the time of operation of only the first evaporator 8.

The control unit 10 closes the solenoid valve 7 when the differential pressure is reduced to an extent enabling generation of an unpleasant sound to be suppressed. The control unit 10 functions as a detecting means for detecting when the differential pressure falls to a predetermined value and a control means for opening the solenoid valve 7 is response to this. At the time t5, when the solenoid valve 7 is turned off and the valve is closed, the flow of the refrigerant of the second refrigerant channel B into the second pressure reducer 5 is cut off. At this time, the differential pressure becomes relatively small, so the water hammer noise generated when the flow of the refrigerant into the second pressure reducer 5 is cut off becomes relatively small.

Note that in the above, the solenoid valve 7 is turned off at a time t5 a predetermined time from the time t4, but it is also possible to turn off the solenoid valve 7 at the point of time when the compressor working capacity (refrigerant compression amount) becomes a predetermined value (for example 20% of rated value) or less.

The control unit 10 provides a delay means for continuing control for reducing the differential pressure for a predetermined time after closing the solenoid valve 7. In this embodiment, the control unit 10 closes the solenoid valve 7, then holds the pressure of the compressor at a low capacity for exactly a predetermined short time. After this, the control unit 10 allows the capacity of the compressor 1 to be raised to the capacity in accordance with the cooling load. At the time t6 a bit after the time t5, the compressor 1 increases the working capacity (refrigerant compression amount) by increasing the rotational speed again. This is so as to again operate the first evaporator 8. Due to this, the inlet refrigerant pressure of the solenoid valve becomes 11.5 MPa, the outlet refrigerant pressure becomes 3.5 MPa, and the differential pressure becomes 8 MPa.

SECOND EMBODIMENT

Figure 2:
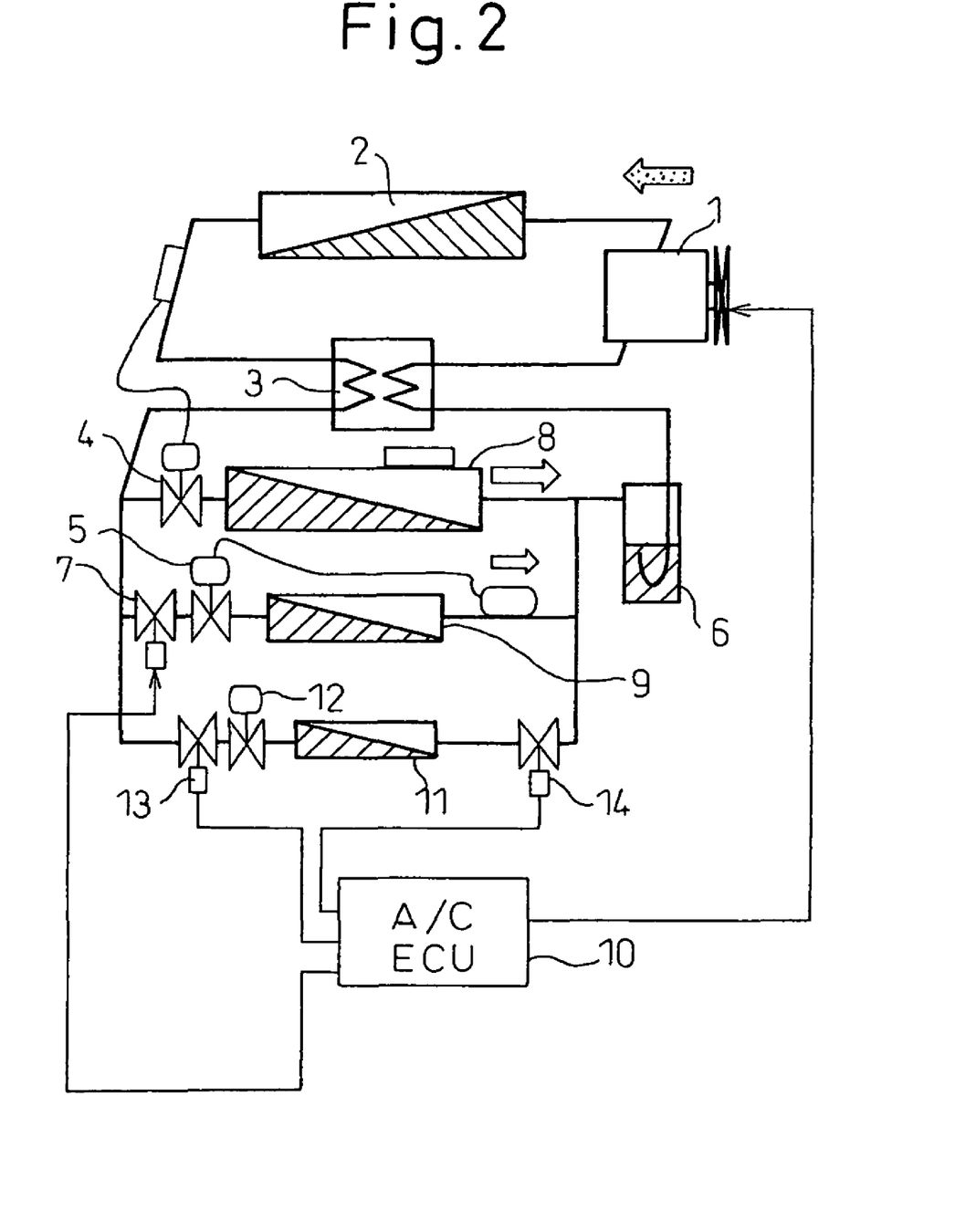
FIG. 2 is a circuit diagram of a refrigeration cycle of a second embodiment according to the present invention.

Next, a second embodiment according to the present invention will be explained with reference to FIG. 2. The second embodiment adds to the first embodiment a set of solenoid valves (two, for inlet and outlet), a pressure reducer, and an evaporator. For this reason, the second embodiment will be explained focusing on the locations different from the first embodiment.

Reference numeral 11 indicates a vehicle refrigerator evaporator (hereinafter referred to as the "third evaporator"). Reference numeral 13 indicates a third evaporator inlet solenoid valve, while 14 indicates a third evaporator outlet solenoid valve. Normally, the two solenoid valves of 13 and 14 are simultaneously turned on and off. Reference numeral 12 indicates a third pressure reducer.

If suddenly operating the third evaporator while the first evaporator is operating, rushing noise is generated in the third pressure reducer 12. The second embodiment can be configured by reading the "third" in the second embodiment as the "second" in the first embodiment to apply the devices for preventing this. That is, the second embodiment can be configured by using the vehicle refrigerator evaporator 11 to replace the second evaporator 9, the refrigerator evaporator inlet solenoid valve 13 to replace the second evaporator solenoid valve 7, and the refrigerator evaporator pressure reducer 12 to replace the second pressure reducer 5 in the first embodiment. Due to this, the rushing noise can be reduced.

Further, when stopping the third evaporator while the first evaporator and third evaporator are operating, the water hammer noise may be reduced in the same way as above.

When stopping the third evaporator while the first evaporator and third evaporator are operating, in the same way as above, the second embodiment is configured by using the "first evaporator and second evaporator" to replace the "first evaporator" in the first embodiment, the vehicle refrigerator evaporator 11 to replace the second evaporator in the first embodiment, the refrigerator evaporator inlet solenoid valve 13 to replace the second evaporator solenoid valve 7 in the first embodiment, and the refrigerator evaporator pressure reducer 12 to replace the second pressure reducer 5 in the first embodiment. Due to this, the rushing noise can be reduced.

Further, the same is true when stopping the third evaporator while the first evaporator and second evaporator are operating. Due to this, the water hammer noise can be reduced.

THIRD EMBODIMENT

Instead of the second pressure reducer 5 of the first embodiment, it is also possible to employ a pressure reducer having a variable aperture function. This pressure reducer gradually changes the cross-sectional area of the flow channel of the refrigerant to the second evaporator 9. This type of slow change can be provided by the response characteristics of the variable aperture or by the control unit 10 for controlling the actuator for driving the variable aperture. The second pressure reducer 5 has a variable aperture for opening or closing the flow of refrigerant to the second evaporator 9. When starting or stopping the second evaporator 9 while the first evaporator 8 is operating, it gradually opens or closes the variable aperture. By gradually opening or closing the variable aperture, the refrigerant smoothly flows or is cut off and the rushing noise or water hammer noise can be reduced. A pressure reducer with such a variable aperture function can be employed in addition to the compressor capacity suppressing means serving as the differential pressure reducing means employed in the first embodiment or instead of the compressor capacity suppressing means serving as the differential pressure reducing means. Further, the solenoid valve 7 may replace the variable aperture. The solenoid valve 7 serving as the variable aperture provides an opening degree in accordance with the control signal from the control unit 10. The control unit 10 gradually increases or decreases the opening degree of the solenoid valve 7 to switch from the closed state to the open state or from the open state to the closed state when starting or stopping the second evaporator 9 while the first evaporator 8 is operating.

FOURTH EMBODIMENT

Figure 4:
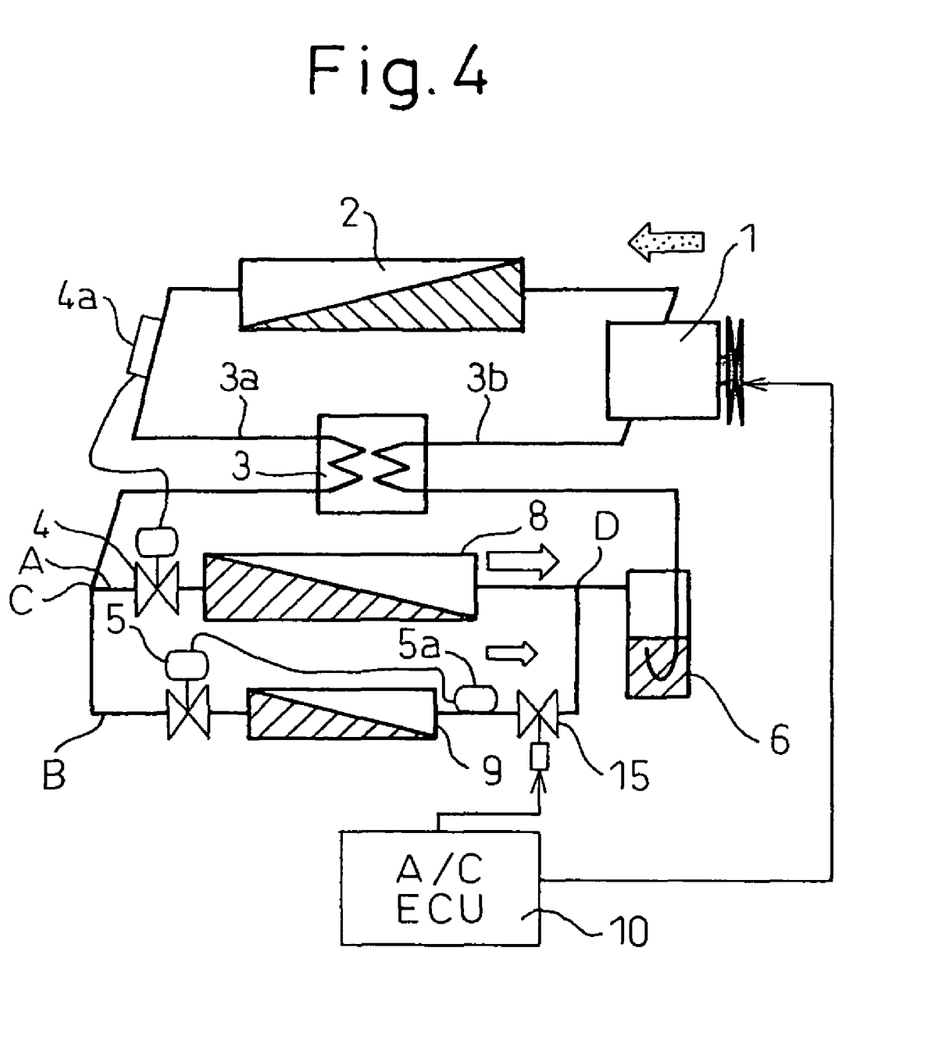
FIG. 4 is a circuit diagram of a refrigeration cycle of a fourth embodiment according to the present invention.

Next, a fourth embodiment according to the present invention will be explained while referring to FIG. 4. The fourth embodiment only changes the position of the second evaporator solenoid valve 7 of the first embodiment. That is, it changes the position of the second evaporator solenoid valve 7 of the first embodiment from an upstream position of the second evaporator 9 to a downstream position. The name is also changed to the "second evaporator downstream solenoid valve 15". By changing the solenoid valve to be positioned downstream of the second evaporator 9, the refrigerant pressure received when the solenoid valve is in the steady state becomes lower than when it is positioned upstream of the second evaporator 9. For this reason, the water hammer noise generated due to the shock at the time of operation of the solenoid valve also becomes relatively small.

FIFTH EMBODIMENT

Figure 5:
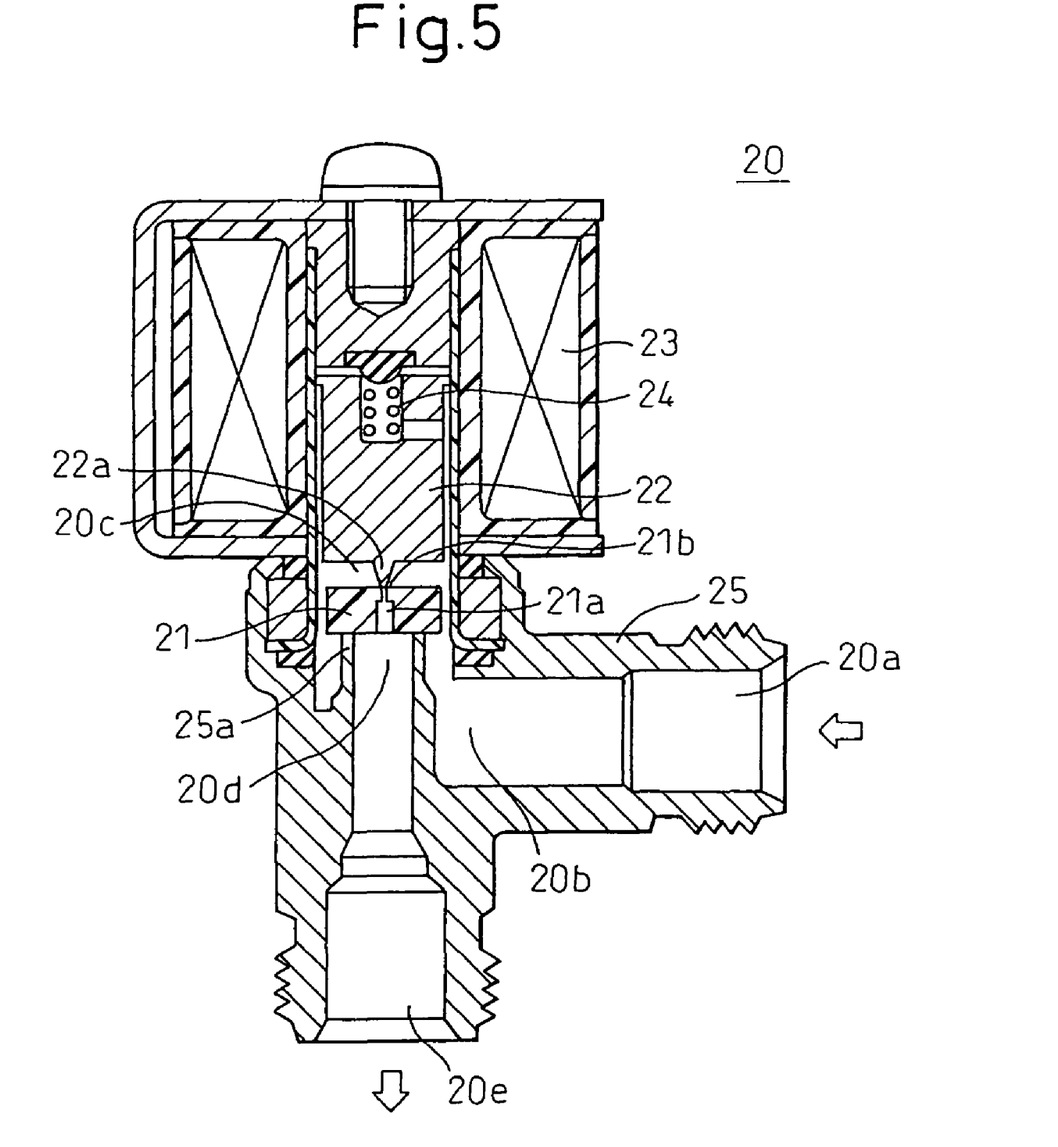
FIG. 5 is a view of a pilot type solenoid valve used in a fifth embodiment according to the present invention.

Next, a fifth embodiment according to the present invention will be explained while referring to FIG. 5. FIG. 5 shows a known pilot type solenoid valve 20 used in the fifth embodiment. The fifth embodiment only changes the second evaporator solenoid valve 7 of the first embodiment or second evaporator downstream solenoid valve 15 of the fourth embodiment from an ordinary direct-acting type solenoid valve to a pilot type solenoid valve.

A pilot type solenoid valve 20, as is known, is comprised of a pilot valve 21, plunger 22, solenoid coil 23, plunger spring 24, body 25, and other parts. Further, the pilot type solenoid valve 20 has the function of opening and closing the space Sb between the valve seat 25a of the body 25 and the pilot valve 21 and the space Sp between the pilot valve 21 and the front end 22a of the plunger 22. When this Sb is opened, the refrigerant flows from the inlet 20a into the solenoid valve 20 and flows out through the 20b, 20d to the outlet 20e.

Here, the basic operation of the pilot type solenoid valve 20 will be briefly explained in relation to the opening operation. Note that this closing operation is the reverse of the opening operation, so the explanation will be omitted. When the voltage is not on at the solenoid coil 23, the space Sb between the valve seat 25a of the body 25 and the pilot valve 21 and the space Sp between the pilot valve 21 and the front end 22a of the plunger 22 are both closed, so the refrigerant will not flow through the solenoid valve 20. When the voltage is on at the solenoid coil 23, the electromagnetic force overcomes the set load of the spring 24, so the plunger 22 is lifted upward. This being the case, the space Sp between the pilot valve 21 and the front end 22a of the plunger 22 opens, the refrigerant flows from the part 20c right above the pilot valve 21 through the orifice part 21a to the part 20d right below the pilot valve 21 and gradually falls in pressure at 20c. After the elapse of a certain time, when the pressure at 20c sufficiently falls, the pilot valve 21 rises due to the pressure of 20b. This being the case, a sufficient channel cross-sectional area is secured between the 20b and 20d and the refrigerant smoothly flows through the solenoid valve 20.

In this way, the opening operation and closing operation of the pilot type solenoid valve is performed in two stages, so when starting the second evaporator while the first evaporator is operating, rushing noise becomes harder to occur. Further, a pilot type solenoid valve can be set in spring force relating to the pilot valve or electromagnetic force for countering this for opening/closing the pilot valve by the pressure difference before and after it in the opening/closing operation of the second stage so as to be smaller than the corresponding force of a usual direct-acting type solenoid valve. For this reason, a pilot type solenoid valve can be reduced in size compared with a usual direct-acting type solenoid valve.

Note that the present invention was described in detail based on specific embodiments, but a person skilled in the art could make various changes, modifications, etc. without departing from the scope and thinking of the present invention.

The invention claimed is:

1. A refrigeration cycle for a vehicle, the refrigerant cycle comprising a compressor compressing a refrigerant, a radiator cooling the refrigerant discharged from said compressor, first and second pressure reducers reducing the pressure of said refrigerant flowing out from said radiator, a first evaporator cooling a front seat region of a vehicle cabin and evaporating said refrigerant flowing out from said first pressure reducer, a second evaporator cooling a rear seat region of the vehicle cabin and evaporating said refrigerant flowing out from said second pressure reducer, one of a second evaporator solenoid valve for opening and cutting off the inflow of said refrigerant to said second evaporator, and a second evaporator downstream solenoid valve for opening and cutting off the outflow of said refrigerant from said second evaporator, a switch for generating a command signal to select an operating state of said second evaporator, a control unit, detecting a differential pressure between an inlet refrigerant pressure and an outlet refrigerant pressure of said one of said second evaporator solenoid valve and said second evaporator downstream solenoid valve and controlling a compression amount of said compressor and said one of said second evaporator solenoid valve and said second evaporator downstream solenoid valve based on said command signal and said differential pressure, wherein when said control unit controls said one of said second evaporator solenoid valve and said second evaporator downstream solenoid valve for starting or stopping operation of said second evaporator, said control unit includes means for changing said differential pressure to a predetermined value by reducing the compression amount of said compressor, then opening or closing the one of said second evaporator solenoid valve and said second evaporator downstream solenoid valve;

after opening or closing the one of the second evaporator solenoid valve and said second evaporator downstream solenoid valve, the control unit increases the compression amount of said compressor in accordance with the cooling load, and wherein when starting or stopping the operation of said second evaporator, said control unit includes means for changing said compression amount slower when decreasing the compression amount of said compressor compared to when increasing the compression amount of said compressor.

2. A refrigeration cycle as set forth in claim 1, wherein said one of said second evaporator solenoid valve and said second evaporator downstream solenoid valve is a pilot type solenoid valve.

3. A refrigeration cycle as set forth in claim 1, wherein said second pressure reducer and said second evaporator solenoid valve are integrally formed.

4. A refrigeration cycle as set forth in claim 1, further comprising
means for controlling an opening degree of said first pressure reducer so as to regulate a refrigerant pressure of said radiator outlet and
means for controlling an opening degree of said second pressure reducer so as to regulate superheating of the refrigerant of said second evaporator outlet.

5. A refrigeration cycle as set forth in claim 1, wherein a working capacity of the compressor is reduced so as to reduce the differential pressure.

* * * * *